No. 12,210. REISSUED APR. 5, 1904.
P. DICKINSON.
SMOKE STACK.
APPLICATION FILED DEC. 15, 1903.
2 SHEETS—SHEET 1.
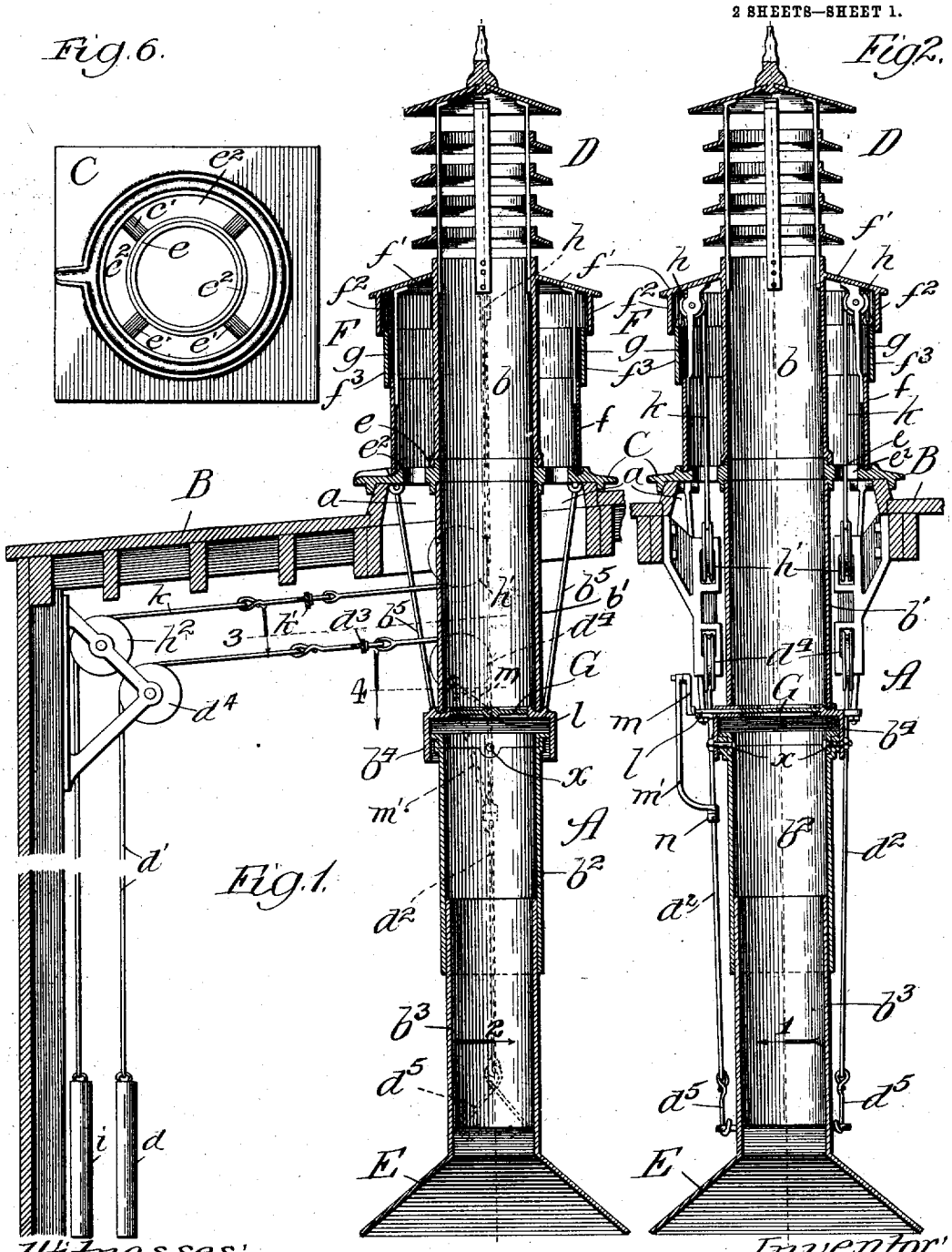
Witnesses:
Chas. E. Gaylord,
Geo. E. Larson.
Inventor:
Paul Dickinson,
By Dyrenforth, Dyrenforth & Lee,
Att'ys
THE NORRIS PETERS CO., PHOTO-LITHO., WASHINGTON, D. C.

No. 12,210. REISSUED APR. 5, 1904.

P. DICKINSON.

SMOKE STACK.

APPLICATION FILED DEC. 15, 1903.

2 SHEETS—SHEET 2.

Witnesses:

Chas. E. Gaylord.

Fr. C. Lawrence.

Inventor:

Paul Dickinson,

By Dyrenforth, Dyrenforth & Lee,

Att'ys.

THE NORRIS PETERS CO., PHOTO-LITHO., WASHINGTON, D. C.

No. 12,210. Reissued April 5, 1904.

UNITED STATES PATENT OFFICE.

PAUL DICKINSON, OF WINNETKA, ILLINOIS.

SMOKE-STACK.

SPECIFICATION forming part of Reissued Letters Patent No. 12,210, dated April 5, 1904.

Original No. 722,288, dated March 10, 1903. Application for reissue filed December 15, 1903. Serial No. 185,321.

*To all whom it may concern:*

Be it known that I, PAUL DICKINSON, a citizen of the United States, residing at Winnetka, in the county of Cook and State of Illinois, have invented a new and useful Improvement in Smoke-Stacks, of which the following is a specification.

My invention relates to an improvement in the class of smoke-stacks or chimneys commonly used on roundhouses for conducting away the smoke that issues from the locomotive-stacks. A chimney of the class to which my improvement relates is shown and described in each of the United States Letters Patent No. 445,714 and No. 457,910, granted to me, respectively, February 3, 1891, and August 18, 1891.

While a chimney of the class referred to serves the purpose of conducting off the smoke that issues from a locomotive-stack brought underneath it, it does not serve, at least not effectually, to ventilate the building; and the primary object of my improvement is so to combine with such a chimney or smoke-stack a ventilator that the two together shall afford an air-flue about the chimney leading from the building to be ventilated to the outer air and adapted to be conveniently opened for use and closed in inclement weather against ingress into the building of rain, snow, and the like.

Further objects of my improvement are to provide for closing the passage through the stack when it is out of use and to provide a yielding construction of hood at the lower end of the stack.

Figure 3:
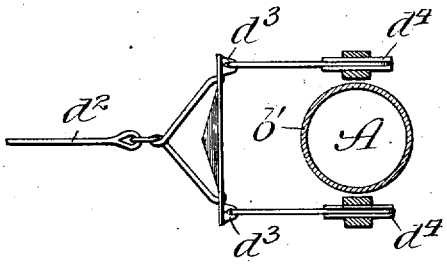
Figure 4:
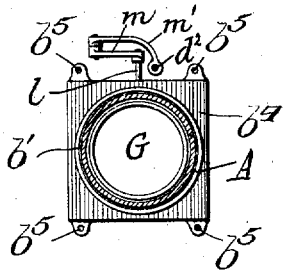
Figure 5:
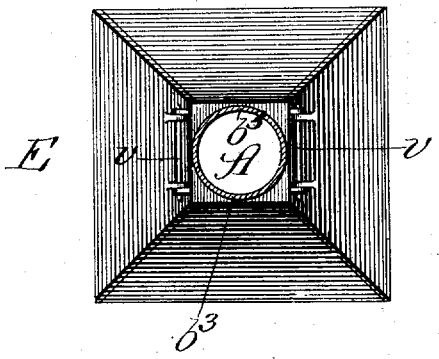
Figure 7:
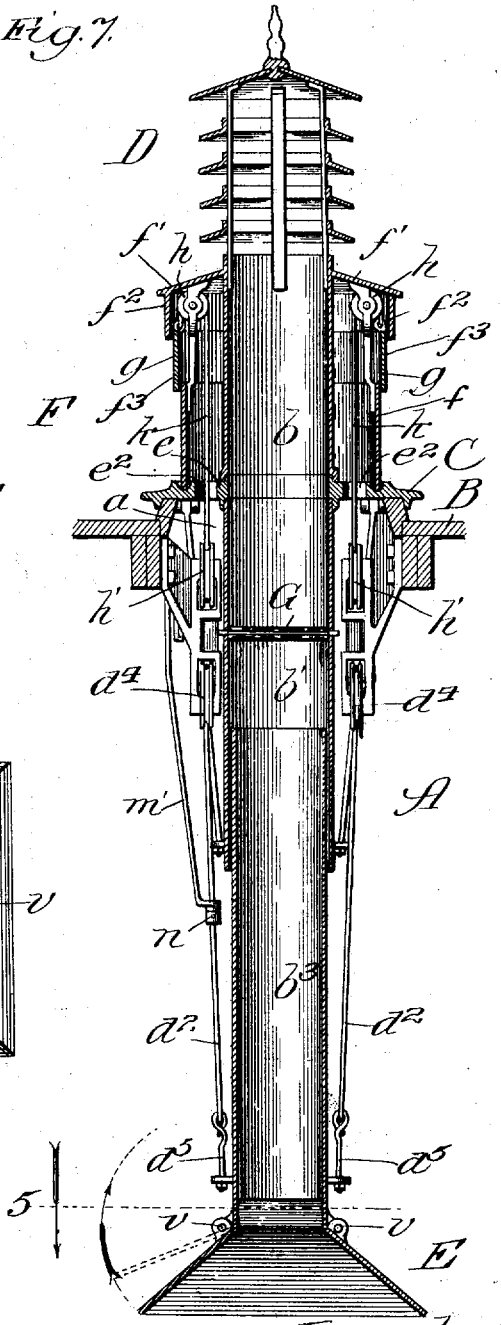

Referring to the accompanying drawings, Figure 1 is a vertical sectional view of my improved stack, showing it in operative position, the section being taken at the line 1 on Fig. 2 and viewed in the direction of the arrow. Fig. 2 is a section taken at the line 2 on Fig. 1 and viewed in the direction of the arrow. Fig. 3 is a section taken at the line 3 on Fig. 1 and viewed in the direction of the arrow, with parts omitted. Fig. 4 is a section taken at the line 4 on Fig. 1 and viewed in the direction of the arrow, but not showing the hood at the lower end of the lowermost stack-section. Fig. 5 is a section taken at the line 5 on Fig. 7 and viewed in the direction of the arrow. Fig. 6 is a plan view of the roof-plate through which the stack passes and which forms the base of the ventilator; and Fig. 7 is a view like that presented by Fig. 2, but illustrating a modification.

A is the smoke-stack or chimney, formed of united sections sustained to extend through the roof B of the building on a roof-plate C, supported on the roof about the opening $a$ therein, through which the chimney passes. The uppermost stack-section $b$ is surmounted by a cowl D. Of the two lower stack-section $b^2$ and $b^3$ the upper one is pivotally hung, as indicated at $x$, according to the construction illustrated in Figs. 1 and 2 to cause it to yield on the annular downwardly-flanged plate $b^4$, Fig. 4, which is suspended by rods $b^5$ from the roof-plate C and sustains the stack-section $b^4$ as the roof-plate sustains the uppermost stack-section $b$. The stack-section $b^3$, which carries a hood E on its lower end, telescopes with the section $b^2$, being sustained in any position to which it may be raised or lowered by a counterbalancing-weight $d$, having a chain-and-rod connection $d'$, which passes over a guide-pulley $d^4$, beyond which it is united with a yoke $d^3$, whence it is branched to pass over two pulleys $d^4$ $d^4$ downward along opposite sides of the stack and fastened at the lower ends of the branches to bails $d^5$ $d^5$, connected with the lower end of the stack-section $b^3$.

The foregoing describes the general construction of one form of roundhouse-smoke-stack to which my invention may be applied, though the ventilator feature of my improvement is no wise dependent for its operation upon pivotally supporting the lower sections nor upon their telescoping, though another feature (that of the smoke-stack valve hereinafter described) depends for the preferable manner of operating it upon the telescoping action of the lowermost stack-section $b^3$, while the yielding-sided hood feature, also hereinafter described, is designed to avoid any necessity for pivotally supporting the lower stack-sections.

For the purpose of combining with the chimney a ventilator F the roof-opening $a$ is made of larger diameter than is required for the passage through it of the chimney, which should be concentric with the opening, and the roof-plate C, sufficiently wide to cover the roof-opening, is formed with a central ring $e$ to closely encircle the stack, this ring being supported at intervals by radial arms $e'$ extending between it and the outer edge of the plate-opening, thereby leaving ventilating-openings $e^2$ about the stack between the radial arms. A ring $f$ rises from the roof-plate about the openings $e^2$ therein, thus encircling the stack-section $b$, which is surrounded near its upper end by a hood $f'$, the depending flange $f^2$ of which is of greater diameter than the ring, thereby leaving between the latter and the hood-flange a ventilating-opening $g$, which is surrounded for its closure by a sleeve $f^3$ of greater diameter than the ring $f$ to fit telescopically over it and of lesser diameter than the hood-flange $f^2$ to fit telescopically within it. This telescoping section $f^3$ of the ventilator is supported on pulleys $h$ $h$, journaled in the hood $f'$ by a branched chain-and-rod connection $k$ with a counterbalancing-weight $i$, said branched connection passing over said pulleys and over guide-pulleys $h'$ $h'$ to a yoke $k'$, to which they are fastened and from which a single length of the chain-and-rod connection $k$ passes over a guide-pulley $h^2$ to the weight to which it is fastened.

To open the ventilator F, the weight $i$ is raised, thereby permitting the sleeve $f^3$ to drop over the ring $f$, and thus uncover to any desired extent the opening $g$, whereby the building may be ventilated through the openings $e^2$ and $g$ around the stack. When it is desired to close the ventilator, as in inclement weather, against the ingress into the building through the opening $g$ of rain, snow, sleet, and the like, the weight $i$, which is adapted to counterbalance the sleeve $f^3$ in any position to which it may be adjusted, is lowered to effect raising of the sleeve $f^3$ into the hood-flange $f^2$ to cover the opening $g$.

When the stack is out of use, the lower telescoping section is raised to remove it out of the path of a locomotive-stack, and in that condition it is desirable to close the stack against the ingress through its interior into the building of rain, snow, and sleet. To this end I provide a damper-like valve G, pivotally supported at opposite points in the stack above the lowermost telescoping section thereof and carrying on its projecting pivot $l$ a crank $m$, connected by a link $m'$ with one of the rod-sections of a chain device $d^2$ to slide up and down on the latter, this rod-section being provided with a button $n$ to abut against the link where it surrounds the rod-section. The connecting means of the valve G with the chain-rod are similar to an ordinary transom-lifter. When a locomotive-stack is brought underneath the hood E, the telescoping section of the smoke-stack is lowered by raising its counterbalancing-weight $d$ to lower the hood over the locomotive-stack, and this operation lowers the stop-button $n$ and permits the valve G to turn on its pivotal support by gravity into the position of opening the passage through the smoke-stack for the escape through it of smoke from the locomotive. To free the locomotive-stack, the lower telescoping section of the smoke-stack is raised to lift off the hood E by lowering the weight $d$, whereby the button $n$ engages the rod-surrounding end of the link $m'$, and thus turns the valve G into the position in which it is illustrated of closing the passage through the stack, in which position it is held by the force of the weight $d$ in keeping the stop-button $n$ against the lower end of the link $m'$.

Where a smoke-stack, whatever its general construction may otherwise be, is unprovided with a swinging or pivotal lower part, it is liable to be damaged when the hood on the telescoping section is lowered over a locomotive-stack by movement of the locomotive without preparatorily raising the hood. To provide against accident of this nature, I make a side of the hood E in line with the railroad-track or, and preferably, as illustrated in Figs. 5 and 7, to opposite sides of the hood in said line, yielding, as by forming them as separate parts of the hood and hinging them thereto at their upper edges, as indicated at $v$, so in case the locomotive should move before the hood is raised from its stack the side of the hood against which the locomotive-stack impinges will be lifted by it, as indicated by the dotted representation in Fig. 7, and permit the locomotive to free itself from the smoke-stack without causing any damage. A stack provided with this feature of the yielding-sided hood need not have the pivotal section $b^2$ in addition to the telescoping section $b^3$; but the latter may be elongated, as shown in Fig. 7, (which is equivalent to forming the two sections $b^2$ and $b^3$ in one,) to telescope with the stack-section $b'$.

What I claim as new, and desire to secure by Letters Patent, is—

1. In combination with a smoke-stack of the character described, an adjustable ventilator formed about the part of the stack which projects beyond the roof of the building provided therewith, and affording controllable communication of the interior of said building with the outer air about said stack, said ventilator having no communication with the interior of the stack, but having its outlet distinct from the stack-outlet, said projecting part of the stack forming the inner ventilator-wall, substantially as described.

2. In combination with a smoke-stack of the character described, a ventilator comprising the roof-plate, open about said stack, a ring rising about the stack from said roof-plate, a hood surrounding the stack above the roof-plate and having a depending flange, an intermediate sleeve supported to telescope with said rising and depending members, and means for raising and lowering said sleeve, substantially as described.

3. In combination with a smoke-stack of the character described, a ventilator comprising a roof-plate open about said stack, a ring about the stack rising from said roof-plate, a hood surrounding the stack above the roof-plate and having a depending flange, an intermediate sleeve telescoping with said rising and depending members, and a counterbalancing-weight connected with said sleeve to sustain it in any position to which it may be adjusted by raising and lowering said weight, substantially as described.

4. In combination with a smoke-stack of the character described, containing a telescoping lower section supported by a counterbalancing-weight having a chain connection with said section, a stop on said chain and a valve journaled in the stack above said section and having a crank and sliding-link connection with said chain, substantially as described.

5. In combination with a smoke-stack of the character described, containing a telescoping lower section, a hood on the lower end of said section having one or more yielding sides, substantially as and for the purpose set forth.

6. In combination with a smoke-stack of the character described, containing a telescoping lower section, a hood on the lower end of said section, having its side or sides in line with the track hinged to swing outwardly, substantially as and for the purpose set forth.

7. In combination with a smoke-stack of the character described, a hood on the lower end of the stack having one or more yielding sides, substantially as and for the purpose set forth.

PAUL DICKINSON.

In presence of—
WALTER N. WINBERG,
WILLIAM B. DAVIES.